United States Patent [19]
Holm

[11] 4,017,405

[45] Apr. 12, 1977

[54] SOLUBLE OIL COMPOSITION

[75] Inventor: LeRoy W. Holm, Fullerton, Calif.

[73] Assignee: Union Oil Company of California, Brea, Calif.

[22] Filed: July 18, 1975

[21] Appl. No.: 597,085

Related U.S. Application Data

[63] Continuation-in-part of Ser. No. 345,184, March 26, 1973, Pat. No. 3,920,073.

[52] U.S. Cl. .................. 252/8.55 D; 166/274; 166/275

[51] Int. Cl.$^2$ .................. E21B 43/16; C09K 3/00

[58] Field of Search ............ 252/8.55 D, 548, 551, 252/553, 558, 355, 353; 166/275, 273, 274

[56] References Cited

UNITED STATES PATENTS

| | | | |
|---|---|---|---|
| 3,330,346 | 7/1967 | Jacobs et al. | 252/8.55 X |
| 3,348,611 | 10/1967 | Reisberg | 166/275 |
| 3,500,923 | 3/1970 | Reisberg | 166/274 |
| 3,508,612 | 4/1970 | Reisberg et al. | 166/274 |
| 3,512,586 | 5/1970 | Holm | 166/273 |
| 3,675,716 | 7/1972 | Farmer et al. | 166/275 |
| 3,691,072 | 9/1972 | Holm | 252/8.55 |
| 3,697,424 | 10/1972 | Holm | 252/8.55 D |
| 3,753,904 | 8/1973 | Holm | 252/8.55 |
| 3,768,560 | 10/1973 | Hill et al. | 166/274 |
| 3,769,209 | 10/1973 | Holm | 252/8.55 |
| 3,811,504 | 5/1974 | Flournoy et al. | 166/273 |
| 3,811,507 | 5/1974 | Flournoy et al. | 166/274 |
| 3,827,497 | 8/1974 | Dycus et al. | 166/274 |

*Primary Examiner*—P.E. Willis, Jr.
*Attorney, Agent, or Firm*—Richard C. Hartman; Dean Sandford; John E. Vanderburgh

[57] ABSTRACT

A soluble oil comprising an admixture of a liquid hydrocarbon, surface active alkyl aryl sulfonates, an organic stabilizing agent, and an alkali metal or ammonium salt of a sulfated alkyl primary alcohol ethoxylate having 12 to 16 carbon atoms in the alkyl group. The preferred ethoxylate is a sulfated surfactant containing an admixture of an alkali metal or ammonium lauryl polyethoxy sulfate having 2 to 6 ethoxy groups and an amide builder. The soluble oil can be substantially anhydrous, or it can contain water present in the form of a water-in-oil microemulsion.

19 Claims, No Drawings

SOLUBLE OIL COMPOSITION

This is a continuation-in-part of application Ser. No. 345,184 filed Mar. 26, 1973 now U.S. Pat. No. 3,920,073.

This invention relates to a soluble oil composition useful in the recovery of oil from subterranean petroleum reservoirs, and more particularly to an improved miscible displacement fluid composition useful in the recovery of petroleum from reservoirs containing excessive amounts of monovalent and polyvalent metal salts.

It has long been recongnized that substantial amounts of oil remain unrecovered in the reservoir at the completion of normal primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil often can be recovered by waterflooding, the efficiency of the waterflood and the ultimate oil recovery can be further improved by introducing a solvent that is miscible with both the connate oil and with the flood water into the reservoir ahead of the flood water.

It is known that both substantially anhydrous soluble oils and soluble oils containing water present in the form of a water-in-oil microemulsion can be employed as the solvent in a miscible-flood water drive process. These soluble oils are generally admixtures of a liquid hydrocarbon, one or more surface active agents, and a stablizing agent, and can contain water in an amount up to the concentration at which the water-in-oil microemulsion inverts to an oil-in-water emulsion. A wide variety of liquid hydrocarbons such as liquefied petroleum gas (LPG), gasoline, mineral oil, lubricating oil, lubricating oil extract and other refinery byproduct oils, crude petroleum, and the like, can be employed as the liquid hydrocarbon base. In many applications, it is preferred to employ crude petroleum as the hydrocarbon base component.

While these soluble oil flooding processes can obtain high oil recoveries under controlled laboratory conditions, it has been found that the recoveries obtainable under actual field conditions are substantially lower, and in some cases are reduced to the extent that the recovery operation is uneconomical. One major factor in the reduced recovery efficiency is that the previously employed soluble oils are incompatible with the mineral salts in the reservoir, which often contain substantial amounts of monovalent and polyvalent salts, and particularly divalent salts such as the water-soluble salts of calcium, magnesium and barium. Tests have shown that reservoirs containing brines having more than about 1.5 weight percent of dissolved monovalent salts and/or more than about 0.15 weight percent of the polyvalent salts are particularly deleterious, in that, upon contact with a water-containing soluble oil, the brine causes water to be rejected from the soluble oil.

In the displacement process, the brine is mobilized ahead of the micellar solution and may only contact the leading edge of the soluble oil bank. If the connate brine is the only source of excessive monovalent and polyvalent cations, this deleterious effect could be compensated for by injecting an additional small amount of soluble oil. However, most clayey constituents of the reservoir rock contain enough exchangeable divalent cations, such as calcium, magnesium and barium ions, to materially affect the efficiency of the displacement process. On contact with the soluble oil, these polyvalent cations are exchanged with monovalent cations in the soluble oil. The amounts of polyvalent ions available for exchange is so great in many reservoirs that any practical amount of known soluble oils injected into the reservoir would pick up enough polyvalent ions to cause phase separation with an accompanying reduction in oil recovery efficiency. Thus, need exists for a soluble oil composition that is not deleteriously affected by excessive monovalent and polyvalent cations and which can be employed in the recovery of oil from subterranean reservoirs containing excessive quantities of monovalent and polyvalent salts.

Accordingly, a principal object of this invention is to provide an improved soluble oil composition that forms stable water-in-oil microemulsions in the presence of high concentrations of monovalent and polyvalent metal salts.

Another object of the invention is to provide an improved soluble oil composition that effects a high recovery of oil from subterranean reservoirs containing excessive amounts of monovalent and polyvalent salts.

Still another object of the invention is to provide an improved soluble oil composition that is relatively unaffected by contact with polyvalent metal ions.

Other objects and advantages of the invention will be apparent from the following description.

Briefly, this invention contemplates a soluble oil composition useful in recovering oil from subterranean petroleum reservoirs containing excessive amounts of monovalent and polyvalent metal salts. The soluble oil comprises an admixture of a liquid hydrocarbon, surface active alkyl aryl sulfonates, an organic stabilizing agent, and an alkali metal or ammonium salt of a sulfated alkyl primary alcohol ethoxylate containing 12 to 16 carbon atoms in the alkyl group. In a preferred composition, the ethoxylate is a sulfated surfactant comprising an admixture of an alkali metal or ammonium lauryl polyethoxy sulfate having 2 to 6 ethoxy groups and an amide builder. The soluble oil can be substantially anhydrous, or it can contain water present in the form of a water-in-oil microemulsion. In either case, it has been found that the improved soluble oil compositions of this invention form stable water-in-oil microemulsions in the presence of high concentrations of monovalent and polyvalent metal salts at all water contents up to the inversion concentration and provide high recovery efficiencies when utilized as a miscible displacement fluid in a miscible flooding process for the recovery of oil.

The soluble oil of this invention is an oleaginous composition which has the ability to spontaneously emulsify with water when admixed therewith. These soluble oils comprise a liquid hydrocarbon, one or more selected surface active alkyl aryl sulfonates, a minor proportion of an organic liquid stablizing agent, and an alkali metal or ammonium salt of a sulfated alkyl primary alcohol ethoxylate having 12 to 16 carbon atoms in the alkyl group. In a preferred composition, the ethoxylate is a sulfated surfactant comprising an admixture of an alkali metal or ammonium lauryl polyethoxy sulfate having 2 to 6 ethoxy groups and an amide builder. The emulsions formed by the addition of water to the soluble oil are of the water-in-oil type in that at water concentrations less than the inversion concentration, oil is the continuous phase and the water is dispersed in the oil in the form of very fine droplets, or micelles, which are less than about 0.1 micron in size and usually range in size from about 100 to 600 A. These emulsions are generally transparent in appearance, and are stable in that they remain as microemulsions on aging, even though the water phase contains in excess of 1.5 weight percent of polyvalent metal salts. By transparent, it is meant that the microemulsions do not have a cloudy or opaque appearance, even though they may contain color bodies. It is recognized of course, that some cloudiness may appear at certain concentrations without adversely affecting the utility of the microemulsions as miscible displacement agents. Emulsions of this type are designated microemulsions to distinquish them from ordinary water-in-oil microemulsions in which the lower limit of particle size of the water droplets is about 0.1 micron. At water concentrations above the inversion concentration, the emulsion inverts to an emulsion of the oil-in-water type in which droplets of oil are dispersed in a continuous water phase. It is preferred that the water concentrations of microemulsions of this invention be maintained below the inversion concentration so as to prevent inversion to emulsions of the oil-in-water type.

One of the major constituents of the soluble oils in accordance with this invention is a liquid hydrocarbon. The particular liquid hydrocarbon employed in formulating the soluble oil in part determines the viscosity and other properties of the soluble oil, and the mobility of the soluble oil in the reservoir, which affect the efficiency of the oil recovery process. Suitable liquid hydrocarbons include crude petroleum, such as crude petroleum previously recovered from the reservoir, or other conveniently available crude oil; distillate petroleum fractions such as refined or semi-refined petroleum products, such as gasoline, naphtha, stove oil, diesel and gas oil; residual products obtained by the distillation of lower boiling fractions from a crude oil, such as bunker fuel oil and other residual products; and low value refinery by-products, such as catalytic cycle oil, lube oil extract, and the like; and liquefied, normally gaseous hydrocarbons, such as propane, butane and LPG. While soluble oils can be prepared from any of these hydrocarbon materials, in many applications it is preferred to employ soluble oils compounded with crude petroleum, and particularly with crude petroleum having a viscosity above about 1 centipoise at 75° F.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water-soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention is the oil-soluble alkyl aryl sulfonates that contain only one sulfonic group attached to an alkyl aryl hydrocarbon. The preferentially oil-soluble alkyl aryl sulfonates are those which in the form of their sodium salts have average molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have average molecular weights of less than about 400 or which contain more than one sulfonic acid group per molecule, i.e., the preferred water-soluble sulfonates are monosulfonates or polysulfonates which in the form of their sodium salts have average equivalent weights of less than about 400. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has an average molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl sulfonate or mixture of sulfonates which in the form of their sodium salts have average molecular weights of more than about 400, and a preferentially water-soluble organic sulfonate, such as an alkyl aryl monosulfonate or mixture of monosulfonates which in the form of their sodium salts have molecular weights of less than about 400 or such as alkyl aryl polysulfonates having average equivalent weights of less than about 400. Alternatively, a mixture of preferentially water-soluble and preferentially oil-soluble sulfonates can be employed, such as a mixture of alkyl aryl sulfonates which in the form of the sodium slat have an average molecular weight in the range of about 400 to 500 and which include both preferentially oil-soluble and preferentially water-soluble sulfonates.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has molecular weight of less than about 400, or by sulfonating sufficiently to form polysulfonates. These sulfonates are preferably in the form of the sodium salt, however other salts can be used, such as the salts of other alkali metals and ammonium salts.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part by weight of preferentially oil-soluble agent per part of water-soluble agent to about 15 parts by weight of oil-soluble agent per part of water-soluble agent, or more preferably to about 12 parts by weight of oil-soluble agent per part of water-soluble agent. That is, the soluble oil compositions of this invention contain between about 1 to 15, or 1 to 12 parts of preferentially oil-soluble sulfonate per part of preferentially water-soluble sulfonate. Although the optimum surfactant combination is dependent upon the characteristics of the particular reservoir, in many operations it is found that superior results are obtained with a surfactant combination containing about 1 to 4 parts by weight of preferentially oil-soluble surface active material per part of preferentially water-soluble surface active material; and more particularly, with a sufactant mixture containing about 2 parts by weight of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated hydrocarbons such as monohydric and polyhydric alcohols, ketones, ethers, and polyhydric alkyl ethers. More specifically, the stabilizing agents are monohydric aliphatic alcohols having 3 to 5 carbon atoms, dihydric aliphatic alcohols containing 2 to 3 carbon atoms, aliphatic ketones containing 4 to 6 carbon atoms, glycol ethers containing 4 to 12 carbon atoms, more particularly 4 to 10 carbon atoms, and dialkylene glycols containing 4 to 6 carbon atoms and preferably 6 carbon atoms. Exemplary monohydric alcohols include propyl alcohol, isopropyl alcohol, n-butyl alcohol, isobutyl alcohol, secondary butyl alcohol, tertiary butyl alcohol, normal amyl alcohol and secondary amyl alcohol. Exemplary polyhydric aliphatic alcohols include ethylene glycol, 1,3-propanediol and 1,2-propanediol. Exemplary aliphatic ketones include methyl ethyl ketone, diethyl ketone and methyl isobutyl ketone. Exemplary glycol ethers include ethylene glycol monoethyl ether (Cellosolve solvent), ethylene glycol monobutyl ether (butyl Cellosolve solvent), diethylene glycol monobutyl ether (butyl Carbitol solvent), diethylene glycol monoethyl ether (Carbitol solvent), diethylene glycol hexyl ether (hexyl Carbitol solvent), ethylene glycol hexyl ether (hexyl Cellosolve solvent), and hexyl glycol monohexyl ether (Cosurfactant 120 ). The terms "Cellosolve" and "Carbitol" are trademarks of the Union Carbide Corporation and "Cosurfactant 120" is a trademark of Amoco Chemical Company. Exemplary dialkylene glycols include diethylene glycol and dipropylene glycol. Specific agents found particularly useful include isopropyl alcohol, secondary butyl alcohol, methyl ethyl ketone, ethylene glycol monoethyl ether, ethylene glycol monobutyl ether, diethylene glycol monobutyl ether, diethylene glycol hexyl ether, and hexyl glycol monohexyl ether.

The alkali metal or ammonium salt of a sulfated alkyl primary alcohol ethoxylate incorporated into the soluble oil composition is characterized by the following formula:

wherein R is a straight or branched chain alkyl radical containing about 12 to 16 carbon atoms; $n$ is an integer having a value of from about 2 to 6; and M is an alkali metal or ammonium cation, exemplary of which are sodium, potassium, lithium and ammonium cations. The number of carbon atoms in the alkyl chain has been found to be critical, in that ethoxylates containing less than about 12, or more than about 16 carbon atoms in the alkyl group are much less efficient in forming stable microemulsions with water containing excessive amounts of dissolved monovalent or polyvalent metal ions. In a preferred composition, the ethoxylate is a sulfated surfactant comprising an admixture of an alkali metal or ammonium lauryl polyethoxy sulfate having 2 to 6 ethoxy groups and an amide builder. The amide builder is an organic substance which, while not a surfactant itself, enhances the surfactant properties of the composition. The amide builder is preferably an alkylol amide, such as an alkylol amide of saturated fatty acids having 10, 12, or 14 carbon atoms and an alkylol amine. It is preferred that the alkylol amine be selected so that the resulting alkylol amide has not more than 3 carbon atoms in each alkylol radical. Among the alkylol amines that are preferred are monoethanol amine, diethanol amine, mono- and dipropanol amine, isopropanol amines, and mono- and diglyceryl amine. In the preferred sulfate surfactant admixture of this invention there are about 3 to 4 parts of ammonium lauryl polyethoxy sulfate per part of amide builder. A commercial liquid detergent marketed by the Procter & Gamble Company under the trademark Orvus K liquid contains the above-described admixture of ammonium lauryl polyethoxy sulfate and an amide builder; and said liquid detergent is fully described in U.S. Pat. No. 2,941,950 to Korpi et al., which is hereby incorporated by reference.

The soluble oil compositions of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material, if used, and the ethoxylate are added. Water-in-oil microemulsions can be prepared by simply adding a desired amount of water to the substantially anhydrous soluble oil. Preferably, the water employed in forming the microemulsion is a salt-containing fresh water having a dissolved salt content of less than about 15,000 ppm, and more preferably less than about 5,000 ppm. Water-soluble salts of a monovalent metal can be added to obtain a water having a desired salt content.

The compositions of this invention comprise a mixture of about 35 to 90 volume percent of liquid hydrocarbon, such as crude petroleum; 0.5 to 8 volume percent of stabilizing agent, such as one of the above-described partially oxygenated organic liquids, or a mixture of these liquids; and 4 to 30 volume percent of surface active alkyl aryl sulfonates, and preferably surface active materials containing both preferentially oil-soluble and preferentially water-soluble organic sulfonates in the previously disclosed proportions. The ethoxylate is employed in an amount proportional to the alkyl aryl sulfonate and in an amount equivalent to about 0.1 to 1.5 parts by weight of ethoxylate per part of alkyl aryl sulfonate, and more preferably from about 0.25 to 0.67 parts of ethoxylate per part of sulfonate. This composition can also contain water present as a water-in-oil microemulsion in an amount up to that amount causing inversion to an oil-in-water emulsion, which is typically at least about 50 volume percent. Also, where the liquid hydrocarbon has a relatively high viscosity, an additional quantity of low viscosity, light liquid hydrocarbon can be added to increase the mobility of the resulting soluble oil to obtain a more favorable mobility ratio between the soluble oil and the following drive fluid. The light hydrocarbon will usually not constitute more than about 25 volume percent of the resulting soluble oil.

The term "substantially anhydrous" as used herein is meant to include soluble oils having not more than minor amounts of water. More particularly, these soluble oils contain less than 10 volume percent of water, and preferably less than about 5 volume percent. Some of the ingredients from which the substantially anhydrous soluble oils are compounded, such as the liquid hydrocarbon, the stabilizing agent, and the petroleum sulfonates, can contain moderate amounts of water, and it is difficult and costly to dehydrate these agents to remove all traces of water. Also, it may be advantageous when compounding the soluble oil to add a small amount of water to the composition. These substantially anhydrous soluble oils are to be distinguished from the high water content microemulsions containing substantial quantities of water, such as from about 10 to 50 percent or more.

The soluble oils of this invention also can be conveniently formulated by first preparing an additive concentrate containing the surface active agents and the stabilizing agent. The soluble oil can then be prepared simply by mixing appropriate quantitites of the additive concentrate and a selected liquid hydrocarbon, such as crude oil; and then, if desired, adding water to form a water-in-oil microemulsion. The additive concentrate is an admixture of preferentially oil-soluble, surface active alkyl aryl sulfonate, 0.1 to 1.5 parts by weight of an alkali metal or ammonium salt of a sulfated alkyl primary alcohol ethoxylate containing 12 to 16 carbon atoms in the alkyl group per part of sulfonate, and stabilizing agent in the proportion of 1 to 12 parts by volume of sulfonate per part of stabilizing agent, and preferably about 2 to 7 parts by volume of sulfonate per part of stabilizing agent. Also the concentrate can contain preferentially water-soluble surface active alkyl aryl sulfonates in the proportion of about 1 to 15, and more preferably, 1 to 4 parts by weight of oil-soluble sulfonate per part of water-soluble sulfonate.

The invention is further described by the following examples which are illustrative of specific modes of practicing the invention and are not intended as limiting the scope of the invention as defined by the appended claims.

EXAMPLE 1

A series of soluble oil compositions, identified as compositions 1A, 1B, 1C and 1D, are prepared by admixing various proportions of a 39° API Texas crude oil; preferentially oil-soluble, surface active, alkyl aryl petroleum monosulfonates marketed by the Sonneborn Division of Witco Chemical Company, Inc. under the trademark Petronate RHL; preferentially water-soluble, surface active, alkyl aryl petroleum sulfonates marketed by the Sonneborn Division of Witco Chemical Company, Inc. under the trademark Pyronate 30; ethylene glycol monobutyl ether marketed by Union Carbide Company under the trademark butyl Cellosolve solvent; and a salt of a sulfated primary alcohol ethoxylate. Petronate RHL is an oil solution containing about 62 percent of mixed preferentially oil-soluble alkyl aryl sodium sulfonates having an average molecular weight in the range of 490–510 and not more than about 5 percent water. Pyronate 30 is an aqueous solution containing 30 percent preferentially water-soluble alkyl aryl sulfonates having a molecular weight in the range of 330–350.

Composition 1A does not contain the ethoxylate. Compositions 1B and 1C contain an aqueous alcoholic solution of about 37.5 percent by weight ammonium lauryl polyethoxy sulfate and 9 percent by weight of an amide builder marketed by the Procter & Gamble Company under the trademark Orvus K Liquid detergent. Composition 1D contains a $C_{12}$–$C_{15}$ alkyl triethoxy sodium sulfate marketed by the Shell Chemical Company under the trademark Neodol 25-3S. The proportions of ingredients employed in these compositions are reported in Table I.

Film Corporation under the trademark Alipal CD-128. A brine containing 9,000 ppm of $Na^+$ ion and 1,250 ppm of $Ca^{++}$ and $Mg^{++}$ ions is incrementally added to the soluble oil. A clear, stable microemulsion is formed at water concentrations below about 15 percent. However, at water concentrations above about 15 percent, cloudy macroemulsions are formed that separate into two phases on standing under quiescent conditions.

This test demonstrates the criticality of the number of carbon atoms in the alkyl group of the alkyl polyethoxy ammonium sulfate. The Alipal CD-128 containing $C_8$–$C_{11}$ alkyl polyethoxy ammonium sulfate is much less effective than the $C_{12}$–$C_{15}$ alkyl polyethoxy sulfates employed in Example 1.

EXAMPLE 3

Three substantially identical, 2-inch square by 4-foot long, Dundee sandstone test cores are first saturated

TABLE 1

| | SOLUBLE OIL COMPOSITIONS | | | |
|---|---|---|---|---|
| | Concentrations, Volume % | | | |
| Ingredient | Soluble Oil 1A | Soluble Oil 1B | Soluble Oil 1C | Soluble Oil 1D |
| Crude Oil | 79.8 | 76.9 | 71.4 | 73.7 |
| Petronate RHL | 11.8 | 8.8 | 11.8 | 11.8 |
| Pyronate 30 | 7.5 | 5.5 | 7.5 | 7.5 |
| Butyl Cellosolve | 1.9 | 1.4 | 1.9 | 1.9 |
| Orvus K Liquid | — | 7.4 | 7.4 | — |
| Neodol 25-3S | — | — | — | 6.8 |

Water containing 1,200 ppm of $Na^+$ ion and 120 ppm of $Ca^{++}$ and $Mg^{++}$ ions is incrementally added to soluble oil 1A. Clear, stable, low-viscosity microemulsions are formed at each incremental water concentration from 0 to 80 percent water. This test is repeated using brine containing 9,000 ppm of $Na^+$ ion and 1,250 ppm of $Ca^{++}$ and $Mg^{++}$ ions. Clear, stable microemulsions are formed at water concentrations below about 8 percent. However, at water concentrations above about 8 percent, cloudy macroemulsions are produced that separate into two phases on standing quiescent for about 1 hour. The brine is also incrementally added to soluble oils 1B, 1C and 1D. Stable microemulsions are formed over a wide range of water concentrations. The results of these tests are summarized in Table 2.

with a synthetic brine containing 7.5 weight percent sodium chloride, 1.5 weight percent calcium chloride and 0.4 weight percent magnesium chloride, and then with crude oil. The cores are then flooded with brine to residual oil saturation. The improved oil recovery obtainable from reservoirs containing excessive amounts of monovalent and polyvalent ions with the soluble oil compositions of this invention is demostrated by the following tests which simulate a tertiary recovery operation in an oil reservoir previously subjected to water flooding.

Three soluble oil compositions, identified as compositions 3A, 3B and 3C are prepared by admixing the following ingredients in the recited proportions:

TABLE 2

| Soluble Oil | Type of Water | Range of Water-Contents That Form Stable Microemulsions, Volume % |
|---|---|---|
| 1A | Low salt content[1] | 0 – 80 |
| 1A | Brine[2] | 0 – 8 |
| 1B | Brine[2] | 0 – 60 |
| 1C | Brine[2] | 0 – 80 |
| 1D | Brine[2] | 0 – 40 |
| 1D | Brine[3] | 0 – 80 |

[1]Contains 1,200 ppm $Na^+$ ion and 120 ppm $Ca^{++}$ and $Mg^{++}$ ions.
[2]Contains 9,000 ppm $Na^+$ ion and 1,250 ppm $Ca^{++}$ and $Mg^{++}$ ions.
[3]Contains 15,000 ppm $Na^+$ ion and 1,250 ppm $Ca^{++}$ and $Mg^{++}$ ions.

EXAMPLE 2

A soluble oil is prepared substantially in accordance with the method described in Example 1 by admixing 76.9 volume percent of crude oil, 8.8 volume percent of RHL Petronate, 5.5 volume percent of Pyronate 30, 1.4 volume percent of butyl Cellosolve, and 7.4 volume percent of an aqueous alcoholic solution containing about 60 percent of $C_8$ –$C_{11}$ alkyl polyethoxy ammonium sulfate marketed by the General Analine and

| | Composition, Vol. % | | |
|---|---|---|---|
| | 3A | 3B | 3C |
| 39° API Illinois Crude Oil | — | 41.3 | — |
| 38° API Texas Crude Oil | 47.0 | — | 41.3 |
| Petronate RHL | 7.0 | 6.9 | 6.9 |
| Pyronate 30 | 4.4 | 4.2 | 4.2 |
| Butyl Cellosolve | 1.6 | 1.2 | 1.2 |
| Water containing 0.4 wt. % NaCl | 40.0 | — | — |
| Water containing 2.3 wt. % NaCl and 0.5 wt. % $CaCl_2$ and $MgCl_2$ | — | 40.0 | 40.0 |

|  | Composition, Vol. % | |
|---|---|---|
| Orvus K Liquid Detergent | — | 6.4 | 6.4 |

The flooding operation is conducted by injecting 0.03 pore volumes of an aqueous polymer solution prepared by dissolving 0.05 weight percent of a water-soluble partially hydrolyzed polyacrylamide marketed by the Dow Chemical Company under the trademark Pusher 700 in tap water. Next, a small quantity of the selected soluble oil, i.e., 0.03 pore volumes of composition 3A or 0.02 pore volumes of compositions 3B or 3C, is injected and displaced through the core by the subsequent injection of a synthetic brine containing 7.5 weight percent of sodium chloride, 1.5 weight percent of calcium chloride, and 0.4 weight percent of magnesium chloride. The produced fluids are recovered and the oil recovery determined. The results of these tests are summarized in Table 3.

TABLE 3

|  | Test 3-1 | Test 3-2 | Test 3-3 |
|---|---|---|---|
| Initial oil saturation, % PV | 33.5 | 33.4 | 30.0 |
| Soluble oil composition | 3A | 3B | 3C |
| Soluble oil slug size, PV | 0.03 | 0.02 | 0.02 |
| Oil recovery, % initial oil | 40.6 | 58.0 | 68.5 |

These tests demonstrate the higher oil recoveries obtainable from high salt-content reservoirs with the soluble oil composition of this invention, even though smaller soluble oil slugs are employed.

EXAMPLE 4

A series of oil recovery tests are conducted on two different cores to demostrate the superior oil recovery obtainable in high salt-content systems with the improved soluble oil compositions of this invention. The cores employed in these tests are 1½-inch square by 4-foot long Berea sandstone and 2-inch square by 4-foot long Boise sandstone. In each test, the cores are first saturated with a synthetic brine containing 7.5 weight percent of sodium chloride, 1.5 weight percent of calcium chloride and 0.4 weight percent of magnesium chloride, and then with a 39° API Illinois crude oil. The oil-saturated cores are then flooded with brine to residual oil saturation.

Three soluble oil compositions, identified as compositions 4A, 4B and 4C are prepared by admixing the following ingredients in the recited proportions:

|  | Compositions, Vol. % | | |
|---|---|---|---|
|  | 4A | 4B | 4C |
| 39° API Illinois Crude Oil | 47.0 | 41.3 | 41.3 |
| Petronate RHL | 7.0 | 6.9 | 6.9 |
| Pyronate 30 | 4.4 | 4.3 | 4.3 |
| Butyl Cellosolve | 1.6 | 1.1 | 1.1 |
| Fresh Water | 40.0 | — | — |
| Water containing 2.3 wt. % NaCl, 0.5 wt. % CaCl$_2$ and MgCl$_2$ | — | 40.0 | 40.0 |
| Orvus K Liquid detergent | — | 6.4 | — |
| Sipon ES[1] | — | — | 6.4 |

[1]A sulfated sodium lauryl alcohol ethoxylate marketed by the Alcolac Chemical Corporation.

The flooding operation is conducted by injecting a specified small amount of a selected soluble oil, i.e., 0.03 pore volumes of soluble oil 4A or 0.02 pore volumes of soluble oils 4B or 4C. The injected soluble oil is then displaced through the core by the subsequent injection of an aqueous polymer solution prepared by dissolving 0.15 weight percent of Pusher 700 polymer in tap water. The produced fluids are recovered and the oil recovery determined. The results of these tests are summarized in Table 4.

TABLE 4

|  | Test Number | | | | |
|---|---|---|---|---|---|
|  | 4-1 | 4-2 | 4-3 | 4-4 | 4-5 |
| Initial Oil Saturation. % PV | 27.3 | 34.1 | 32.5 | 32.7 | 33.5 |
| Core | Boise | Boise | Berea | Berea | Berea |
| Soluble Oil | 4A | 4B | 4A | 4B | 4C |
| Soluble Oil slug size, PV | 0.03 | 0.02 | 0.03 | 0.02 | 0.02 |
| Oil recovery, % of Initial Oil | 81 | 91 | 71 | 85 | 83 |
| Bbls. Oil/Bbl. of Soluble Oil | 8 | 15 | 7.5 | 13.7 | 13.5 |

These tests demonstrate that higher oil recoveries can be obtained from reservoirs containing excessive amounts of metal salts with the soluble oil compositions of this invention than can be obtained with 50 percent larger quantities of conventional soluble oil compositions.

EXAMPLE 5

A series of soluble oil compositions are prepared by admixing 68.9 volume percent of Illinois crude oil, 11.4 volume percent of Petronate RHL sulfonate, 7.0 volume percent of Pyronate 30 sulfonate, 2.1 volume percent of butyl Cellosolve solvent, and 10.6 volume percent of a selected, commercially available, alkali metal or ammonium salt of a sulfated alkyl primary alcohol ethoxylate. A synthetic brine containing 2.3 weight percent of sodium chloride and 0.5 weight percent of calcium and magnesium chloride is added to each of the soluble oils in incremental portions, and the appearance of the resulting microemulsion observed at each increment of water addition and the brine tolerance of the soluble oil determined. The brine tolerance of a soluble oil is defined as the maximum volume percent of brine that can be added to the soluble oil to form stable microemulsions. These data are summarized in Table 5.

TABLE 5

| Sulfated Alkyl Primary Alcohol Ethoxylate | | | Brine Tolerance, Vol. % |
|---|---|---|---|
| Trademark | Manufacturer | Chemical Class |  |
| Orvus K Liquid | Procter & Gamble Co. | Sulfated ammonium lauryl alcohol | 80 |

TABLE 5-continued

| Sulfated Alkyl Primary Alcohol Ethoxylate | | | Brine Tolerance, Vol. % |
|---|---|---|---|
| Trademark | Manufacturer | Chemical Class | |
| Alipal CD-128 | GAF Corporation | ethoxylate plus amide builder Sulfated ammonium $C_8$–$C_{11}$ primary alcohol ethoxylate | <16.7 |
| Sipon ES | Alcolac Chem. Corp. | Sulfated sodium lauryl alcohol ethoxylate | 68 |
| Avirol 101 | Standard Chemical Products, Inc. | Sodium lauryl sulfate | 65 |
| Avirol BOD 153 | " | Sodium alkyl polyether sulfate | <16.7 |
| Duponal RA | DuPont Company | Fortified sodium ether alcohol sulfate | 56.5 |

EXAMPLE 6

A soluble oil additive concentrate is prepared by admixing an oil solution containing about 62 percent of preferably oil-soluble alkyl aryl sulfonates having an average molecular weight in the range of 490–510, about 0.8 parts by weight of sodium salt of a sulfated $C_{12}$–$C_{16}$ alkyl primary alcohol ethoxylate per part of sulfonate, and secondary butyl alcohol in the proportion of 5 parts by volume of the sulfonate per part of stabilizing agent.

A soluble oil is prepared by admixing 100 parts of the additive concentrate prepared in the above step with 370 parts by volume of crude petroleum and 20 parts by volume of water.

EXAMPLE 7

A soluble oil additive concentrate is prepared by admixing an oil solution containing about 62 percent of preferably oil-soluble alkyl aryl sulfonates having an average molecular weight in the range of 490–510, about 0.25 parts by volume of an aqueous solution containing 30 percent preferentially water-soluble petroleum sulfonates having an average molecular weight in the range of 330–350 per part of oil-soluble sulfonate, about 0.6 parts by weight of sodium salt of a sulfated $C_{12}$–$C_{16}$ alkyl primary alcohol ethoxylate per part of sulfonate, and ethylene glycol hexyl ether in the proportion of 5 parts by volume of the sulfonate per part of stabilizing agent.

A soluble oil is prepared by admixing 100 parts of the additive concentrate prepared in the above step with 370 parts by volume of crude petroleum and 200 parts by volume of water.

Various embodiments and modifications of this invention have been described in the foregoing description and examples, and further modifications will be apparent to those skilled in the art. Such modifications are included within the scope of this invention as defined by the following claims.

Having now described the invention, I claim:

1. An oil-external soluble oil composition comprising an admixture of a liquid hydrocarbon, preferentially oil-soluble surface active alkyl aryl sulfonates, a liquid organic stabilizing agent, and a sulfated surfactant comprising an admixture of alkali metal or ammonium lauryl polyethoxy sulfate having 2 to 6 ethoxy groups and an amide builder.

2. The composition defined in claim 1 wherein said soluble oil comprises an admixture of about 35 to 90 volume percent of said liquid hyrocarbon, 0.5 to 8 volume percent of said stabilizing agent, 4 to 30 volume percent of said alkyl aryl sulfonates, and 0.1 to 1.5 parts by weight of said sulfated surfactant per part of sulfonate.

3. The composition defined in claim 1 wherein said stabilizing agent is selected from the group consisting of monohydric aliphatic alcohols having 3 to 5 carbon atoms, dihydric aliphatic alcohols having 2 to 3 carbon atoms, aliphatic ketones having 4 to 6 carbon atoms, glycol ethers having 4 to 12 carbon atoms, and dialkylene glycols having 4 to 6 carbon atoms.

4. The composition defined in claim 1 wherein said liquid hydrocarbon is crude petroleum.

5. The composition defined in claim 1 including preferentially water-soluble alkyl aryl sulfonates in the proportion of about 1 to 15 parts by weight of preferentially oil-soluble sulfonates per part of preferentially water-soluble sulfonate.

6. The composition defined in claim 5 wherein said preferentially oil-soluble alkyl aryl sulfonates are alkyl aryl monosulfonates which in the form of their sodium salts have an average molecular weight above about 400 and said preferentially water-soluble alkyl aryl sulfonates are alkyl aryl monosulfonates exhibiting an average molecular weight of less than about 400 or are alkyl aryl polysulfonates.

7. The composition defined in claim 1 wherein said lauryl polyethoxy sulfate is an ammonium lauryl polyethoxy sulfate.

8. The composition defined in claim 1 including water present in the form of a water-in-oil microemulsion.

9. The composition defined in claim 8 including a water-soluble monovalent salt in an amount up to about 15,000 parts per million parts of water.

10. The composition defined in claim 8 wherein said water is present in an amount less than about 10 volume percent.

11. The composition defined in claim 8 wherein said water is present in an amount up to about 50 volume percent.

12. An oil-external soluble oil composition comprising 35 to 90 volume percent of crude petroleum, 0.5 to 8 volume percent of a stabilizing agent selected from the group consisting of secondary butyl alcohol, ethylene glycol monoethyl ether, ethylene glycol monobutyl ether, diethylene glycol monoethyl ether, diethylene glycol hexyl ether, ethylene glycol hexyl ether, and hexyl glycol monohexyl ether; about 4 to 30 volume percent of a mixture of preferentially oil-soluble surface active alkyl aryl monosulfonates that in the form of their sodium salts have average molecular weights above about 400 and preferentially water-soluble surface active alkyl aryl monosulfonates that in the form of their sodium salts have average molecular weights below 400 or preferentially water-soluble surface active alkyl aryl polysulfonates, said sulfonates being present in the proportion of about 1 to 4 parts by weight of preferentially oil-soluble sulfonates per part of preferentially water-soluble sulfonate; and a sulfated surfactant comprising an admixture of an ammonium lauryl polyethoxy sulfate having 2 to 6 ethoxy groups and an amide builder, said sulfated surfactant being present in the amount of 0.1 to 1.5 parts by weight of sulfated surfactant per part of sulfonate.

13. A soluble oil additive concentrate consisting essentially of an admixture of preferentially oil-soluble surface active alkyl aryl sulfonates, 0.1 to 1.5 parts by weight of a sulfated surfactant consisting essentially of an admixture of alkali metal or ammonium lauryl polyethoxy sulfate having 2 to 6 ethoxy groups and an amide builder, and a stabilizing agent selected from the group consisting of monohydric aliphatic alcohols having 3 to 5 carbon atoms, aliphatic ketones having 4 to 6 carbon atoms, glycol ethers having 4 to 12 carbon atoms, and dialkylene glycols having 4 to 6 carbon atoms, in the proportion of 1 to 12 parts by volume of said sulfonates per part of stabilizing agent.

14. The composition defined in claim 13 wherein said lauryl polyethoxy sulfate is an ammonium lauryl polyethoxy sulfate.

15. The composition defined in claim 14 including preferentially water-soluble alkyl aryl sulfonates in the proportion of about 1 to 15 parts by weight of preferentially oil-soluble sulfonates per part of preferentially water-soluble sulfonate.

16. The composition defined in claim 15 wherein said preferentially oil-soluble alkyl aryl sulfonates are alkyl aryl monosulfonates which in the form of their sodium salts have an average molecular weight above about 400 and said preferentially water-soluble alkyl aryl sulfonates are alkyl aryl monosulfonates exhibiting an average molecular weight of less than about 400 or are alkyl aryl polysulfonates.

17. The composition defined in claim 16 wherein said stabilizing agent is ethylene glycol monobutyl ether.

18. The composition defined in claim 16 wherein said stabilizing agent is secondary butyl alcohol.

19. The composition defined in claim 16 wherein said stabilizing agent is hexyl glycol monohexyl ether.

* * * * *